United States Patent [19]

Onizawa

[11] 4,254,016
[45] Mar. 3, 1981

[54] COMPOSITION CONTAINING VINYLPYRIDINE-STYRENE-BUTADIENE COPOLYMER, AND USE THEREOF AS ADHESIVE

[75] Inventor: Masao Onizawa, Ohmiya, Japan

[73] Assignee: Sanyo Trading Co., Ltd., Tokyo, Japan

[21] Appl. No.: 105,747

[22] Filed: Dec. 19, 1979

Related U.S. Application Data

[63] Continuation-in-part of Ser. No. 32,883, Apr. 24, 1979, abandoned.

[51] Int. Cl.$^3$ .............................................. C08K 5/17
[52] U.S. Cl. ...................... 260/45.85 A; 260/45.85 N
[58] Field of Search ................ 260/45.85 A, 45.85 N, 260/31.2 N, 45.8 N, 8, 7; 526/265

[56] References Cited

U.S. PATENT DOCUMENTS

| | | | |
|---|---|---|---|
| 1,477,805 | 12/1923 | Bedford | 260/135 |
| 2,746,943 | 5/1956 | Pritchard | 526/265 |
| 2,862,902 | 12/1958 | Pritchard | 526/265 |
| 3,004,936 | 10/1961 | Howland et al. | 260/8 |
| 3,027,351 | 3/1962 | Lichty | 260/45.85 |
| 3,859,250 | 1/1975 | Fodor | 260/45.85 A |
| 3,867,328 | 2/1975 | Fahey | 260/29.3 |
| 3,955,033 | 5/1976 | Elmer | 260/29.6 |
| 4,092,279 | 5/1978 | Piskotti | 260/8 |
| 4,146,689 | 3/1979 | Onizawa | 260/884 |

FOREIGN PATENT DOCUMENTS 1350764 12/1963 France .

*Primary Examiner*—J. P. Hoke
*Attorney, Agent, or Firm*—Wenderoth, Lind & Ponack

[57] ABSTRACT

A composition comprising a vinylpyridine-styrene-butadiene copolymer and at least one amino acid selected from the group consisting of proline, leucine, isoleucine, homoserine, valine, α-aminobutyric acid, γ-aminobutyric acid, citrulline, lysine, ornithine, arginine, glutamic acid, aspartic acid, and salts of these amino acids. The composition may optionally contain sulfur and/or sulfur donor.

6 Claims, No Drawings

COMPOSITION CONTAINING VINYLPYRIDINE-STYRENE-BUTADIENE COPOLYMER, AND USE THEREOF AS ADHESIVE

CROSS-REFERENCE TO RELATED APPLICATION

This is a continuation-in-part of application Ser. No. 32,833, filed on Apr. 24, 1979 now abandoned.

FIELD OF THE INVENTION

This invention relates to a composition comprising a vinylpyridine-styrene-butadiene copolymer (to be referred to hereinbelow as a VSB copolymer) and a specified amino acid; a composition comprising the VSB copolymer, sulfur and/or a sulfur donor, and the specified amino acid; and use of these compositions as adhesives.

BACKGROUND OF THE INVENTION

An RFL adhesive is mainly used as an adhesive for bonding tire cords to rubber in tires. The RFL adhesive is a mixture of a resorcinol-formaldehyde resin and a rubber latex. In the early stage, a natural rubber latex was used as the rubber latex, but later superseded by synthetic rubber latices. Among them, a latex of a VSB copolymer (VSB latex) is known to produce an RFL adhesive having the best performance. In addition to the RFL adhesive, the VSB latex can also be used as an adhesive in the form of a mixture with an isocyanate, or with an isocyanate and an ethyleneurea compound.

The problem still desired to be improved in the aforesaid adhesives based on a VSB copolymer, particularly an RFL adhesive based on a VSB copolymer is that the adhesion strengths of these adhesives decrease with time. For example, a reduction in adhesion strength between tire cords and rubber occurs during the running of an automobile, and may sometimes result in the breakage of the tire. Although the cause of the decrease of the adhesion strength in a tire has not yet been completely elucidated because of the great complexity of actions exerted on the tire, it is believed to be at least certain that the temperature rise of the tire owing to internal heat buildup is one cause. During the running of an automobile, the tires undergo repetitive stresses of various types such as tensile, shearing, compressive and flexural stresses, and the resulting hysteresis loss (i.e., energy loss) causes heat buildup within the tires.

The present inventor performed an experiment simulating the temperature rise of a tire owing to internal heat buildup (the experiment will be described in detail hereinbelow), and found that the VSB copolymer has extremely poor resistance to high temperatures, and when heated to 160° C., it decomposes to evolve gases and consequently deforms (Experiment A). When sulfur is added to the VSB copolymer, the generation of gases and, consequently, the deformation of the VSB copolymer become remarkable as a result of heating (Experiment B). The present inventor found that the addition of a small amount of a certain amino acid to the VSB copolymer markedly reduces the generation of gases and the deformation of the copolymer owing to heating (Experiment C). The present inventor also found that when sulfur is added to the VSB copolymer containing the amino acid produced in Experiment C, the generation of gases and the deformation of the copolymer owing to heating are further reduced (Experiment D). In other words, when the VSB copolymer alone is used, the addition of sulfur accelerates the generation of gases and the deformation of the copolymer, but when the amino acid is present together with the VSB copolymer, the addition of sulfur unexpectedly inhibits the generation of gases and the deformation of the copolymer.

As shown by these Experiments, the thermal stability of the VSB copolymer can be improved by adding a specified amino acid to the VSB copolymer. This is desirable for removing the decrease with time of the adhesion strength of adhesives based on the VSB copolymer, especially the RFL adhesive.

SUMMARY OF THE INVENTION

This invention provides a two-component composition comprising a vinylpyridine-styrene-butadiene copolymer (VSB copolymer) and at least one amino acid selected from the group consisting of proline, leucine, isoleucine, homoserine, valine, α-aminobutyric acid γ-aminobutyric acid, citrulline, lysine, ornithine, arginine, glutamic acid, aspartic acid and salts of these amino acids.

The invention also provides a three-component composition comprising the aforesaid-two-component composition and sulfur and/or a sulfor donor.

The two-component and three-component compositions of this invention are suitable for use as adhesives.

DETAILED DESCRIPTION OF THE INVENTION

Tires for automobiles and air planes are usually produced by preparing an RFL adhesive from a mixture of an aqueous solution of a condensate of resorcinol and formaldehyde and a VSB latex, dipping tire cords in the RFL adhesive for a predetermined period of time, withdrawing the tire cords and drying them to obtain tire cords coated with the RFL adhesive, embedding the tire cords in a natural or synthetic rubber (for example, a styrene/butadiene rubber) containing a vulcanizing agent such as sulfur, and then heating the assembly to the vulcanization temperature (e.g., 130° to 180° C.), whereby the vulcanization of rubber and the bonding of rubber to the tire cords are performed simultaneously.

In view of the fact that the above manufacturing method is usually practiced to produce tires, the present inventor produced a plate-like specimen of the VSB copolymer, and heat-treated it at 160° C. for 30 minutes. In 10 to 20 minutes, malodorous gases were generated, and the surface of the plate-like specimen became rough. [Experiment A].

A plate-like specimen was produced from a uniform mixture of the VSB copolymer and 2% by weight of sulfur or a sulfur donor, and heat-treated at 160° C. for 30 minutes. Evolution of gases was greater than in Experiment A using the VSB copolymer alone and the gases were more malodorous. As a result, the plate-like specimen had innumerable cracks on its surface and an uneven thickness. [Experiment B].

From the results of Experiment A and B, the present inventor assumed the following mechanism as at least one case of the reduced adhesion strength between rubber and tire cords after long-term running of an automobile tire. The temperature of the tire rises to a fairly high temperature (e.g., 100° C. or higher) owing to internal heat buildup during running, and in the meantime, sulfur (vulcanizer) contained in rubber constituting the tire migrates partly to the RFL adhesive. Hence, the same experimental conditions (the heat-treatment of VSB copolymer in the presence of sulfur) are produced. This may cause the generation of gases and the decrease of the adhesion strength between the rubber and the tire cords.

The present invention produced a plate-like sample from a uniform mixture of the VSB copolymer and 2% by weight of the amino acid specified in this invention (e.g., proline), and heat-treated it at 160° C. for 30 minutes. It was unexpectedly found that as compared with Experiment A in which the VSB copolymer was used alone, the generation of gases decreased markedly, and the heat-treated plate-like sample showed much higher smoothness. [Experiment C].

A plate-like specimen was prepared from a uniform mixture of the VSB copolymer and 2% by weight each of proline and sulfur (or a sulfur donor), and heat-treated it at 160° C. for 30 minutes. It was found surprisingly that the generation of gases was reduced further as compared with Experiment C using a mixture of the VSB copolymer and proline and was scarcely noted. No substantial change occured in the surface condition of the plate-like specimen as a result of the heat-treatment. [Experiment D]. In Experiment D, the cure curve of the VSB copolymer led to the confirmation that it can be cured with sulfur. The resulting reaction product had good properties as vulcanized rubber.

The results of Experiments A to D demonstrate that when sulfur or a sulfur donor is added to the VSB copolymer, heat-treatment of the mixture accelerates the generation of gases, whereas the addition of an amino acid specified in this invention to the VSB copolymer inhibits the generation of gases by heat-treatment. This fact has been completely unknown in the past. It was also discovered that when sulfur or a sulfur donor is added to a mixture of the VSB copolymer and the specified amino acid used in this invention, the generation of gases owing to heat-treatment is reduced to a greater degree. This fact is quite unexpected in view of the fact that sulfur or a sulfur donor rather accelerates the generation of gases when added to the VSB copolymer in the absence of the amino acid.

As is apparent from the above statement, the compositions of this invention are suitable for use as adhesives for rubber, and can afford an RFL adhesive of improved performance by substituting them for the VSB copolymer conventionally used in the RFL adhesive.

The VSB copolymer itself used in this invention is known. For use in this invention, a VSB copolymer composed of 65 to 95% by weight of butadiene, 10 to 20% by weight of styrene and 2 to 20% by weight of vinylpyridine is preferred. A VSB copolymer composed of 75% by weight of butadiene, 15% by weight of styrene and 15% by weight of vinylpyridine is most preferred.

The specified amino acid used in this invention is at least one member selected from the group consisting of proline, leucine, isoleucine, homoserine, valine, α-aminobutyric acid, γ-aminobutyric acid, citruline, lysine, ornithine, arginine, glutamic acid, aspartic acid and salts of these amino acids. Of these, proline, leucine, isoleucine, and homoserine are preferred. As will be shown hereinbelow in Example 2, the use of amino acids other than those specified in this invention, for example serine, tryptophan, threonine and cystine, cannot inhibit the generation of gases caused by the heat-treatment of the VSB copolymer.

In respect to the salts of the amino acids, alkali metal salts, inorganic mineral acid salts and lower aliphatic carboxylic salts are contemplated. By the term "lower alphatic" is meant those acids having 2–5 carbon atoms in their structure. Examples of the preferred salts are sodium or potassium salts of glutamic or aspartic acid, the monohydrochloride or lysine, ornithine or arginine and salts produced by adding one molecule of a lower alphatic carboxylic acid selected from acetic acid, propionic acid, butyric acid and valeric acid to lysine, ornithine or arginine. The structural formulas for certain of the inorganic and organic acid salts of these common acids will be set forth below:

L-Lysine Monohydrochloride

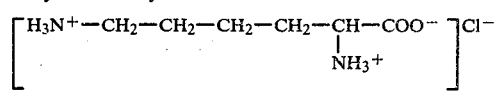

L-Ornithine Monohydrochloride

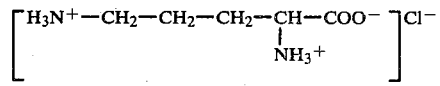

L-Arginine Monohydrochloride

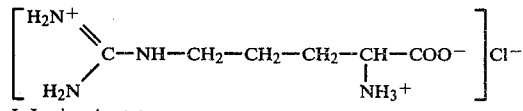

L-Lysine Acetate

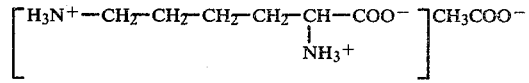

The sulfur donor used in the composition of this invention denotes a substance which releases active sulfur at the crosslinking temperature. Such a sulfur donor is known, and includes, for example, sulfur compounds such as sulfur monochloride, sulfur dichloride, morpholine disulfide, alkylphenol disulfides, N,N'-dithiobis(-hexahydro-2H-azepinone-2), and phosphorus containing polysulfides; thiazole compounds such as 2-(4'-morpholinodithio)benzothiazole; and thiuram polysulfide compounds such as tetramethylthiuram disulfide, activated tetramethylthiuram disulfide, tetraethylthiuram disulfide, tetrabutylthiuram disulfide, N,N'-dimethyl-N,N'-diphenylthiuram disulfide, dipentamethylene disulfide, dipentamethylenethiuram disulfide, dipentamethylenethiuram hexasulfide, cyclopentamethylenethiuram disulfide and mixed alkylthiuram disulfides.

The amino acid content of the composition of this invention is 0.01 to 30 parts by weight, preferably 0.1 to 5 parts by weight, per 100 parts by weight of the VSB copolymer. The content of sulfur and/or the sulfur donor in the composition of this invention is 0.01 to 30 parts by weight, preferably 0.1 to 5 parts by weight, per 100 parts by weight of the VSB copolymer.

An RFL adhesive can be prepared from the composition of this invention by first forming a latex containing the VSB copolymer and the amino acid and optionally sulfur and/or the sulfur donor in the proportions described hereinabove, and then mixing the latex with an aqueous solution of a resorcinol-formaldehyde resin. Preferably, the VBS copolymer content in the latex is 35 to 45% by weight. Usually, the concentration of the entire so lids of the RFL adhesive is 10 to 20% by weight, and the RFL adhesive contains 10 to 30 parts by weight, preferably 15 to 20 parts by weight, of the resorcinol-formaldehyde resin per 100 parts by weight of the VSB copolymer.

The composition of this invention may optionally contain other additives such as fillers and thickeners.

The following Examples illustrate the present invention in more detail. The tensile strength, elongation and modulus were measured at a pulling speed of 200 mm/min. using a Schopper tensile tester in accordance with JIS K-6301. The hardness was measured by using a hardness tester of type A of JIS. The proportions of the ingredients of rubber compositions are expressed in parts by weight.

EXAMPLE 1

Three types of compositions (two-component compositions in accordance with this invention) having the recipes shown in Runs Nos. 1 to 3 in Table 1 were prepared in a customary manner using an open roll. Paraffin paper for prevention of tackiness was applied to a mold, and each of these compositions was heat-treated for 30 minutes with a steam press held at 160° C.

For comparison, the VSB copolymer alone was heat-treated under the same conditions.

After the heat-treatment, each of the samples taken out of the mold was observed. The sample in Comparative Run No. 1 showed a great deformation of its surface caused by the evolution of gases, whereas the samples obtained in Runs Nos. 1 to 3 showed a marked reduction in gas generation and surface deformation.

TABLE 1

|  | Run No.1 | Run No.2 | Run No.3 | Comparative Run No.1 |
| --- | --- | --- | --- | --- |
| VSB copolymer[1] | 100 | 100 | 100 | 100 |
| Proline | 5 | — | — | — |
| Leucine | — | 5 | — | — |
| Homoserine | — | — | 5 | — |
| Degree of deformation of the surface owing to gas generation | Small | Small | Small | Large |

Note:
The VSB copolymer[1] was the one obtained by drying Nipol 2518 FS ®, a product of Nippon Zeon Co., Ltd.

EXAMPLE 2

Three-component compositions shown in Runs Nos. 1 to 7 in Table 2 were prepared in a customary manner using an open roll. Each of the compositions was heat-treated at 160° C. for 20 minutes with a steam press. The amino acids used are shown in Table 3. With the three-component compositions in Runs Nos. 1 to 7 in Example 2, the generation of gases was more effectively inhibited than with the two-component compositions of Runs Nos. 1 to 3 in Example 1, and as a result, plates of the vulcanized VSB copolymer having a good surface condition could be produced. The properties of the vulcanized VSB copolymers obtained are shown in Table 3.

For comparison, the composition of Comparative Run No. 1 composed only of the VSB copolymer and sulfur was heat-treated at 160° C. for 20 minutes. The VSB copolymer taken out of the mold developed numerous cracks on its surface while evolving gases. Furthermore, it had a greatly uneven surface, and the properties of the copolymer could not be measured.

For further comparison, compositions containing serine, tryptophan, threonine and cystine, respectively, which are the amino acids outside the scope of the invention were prepared, and heat-treated at 160° C. for 20 minutes in Comparative Runs Nos. 2 to 5. As in Comparative Run No. 1 described hereinabove, the samples were heavily deformed owing to the generation of gases, and the effect of adding the amino acids was not noted at all.

TABLE 2

|  | Runs Nos. 1 to 7 | Comparative Run No. 1 | Comparative Runs Nos. 2 to 5 |
| --- | --- | --- | --- |
| VSB copolymer[1] | 100 | 100 | 100 |
| SRF L carbon black[2] | 40 | 40 | 40 |
| Sulfur | 2 | 2 | 2 |
| Amino acid[3] | 2 | — | 2 |

Note
[1]Same as in Example 1.
[2]Self-reinforcing low structure carbon black added as a reinforcing agent.
[3]The amino acids used in Runs Nos. 1 to 7 are shown in Table 3, and the amino acids used in Comparative Runs Nos. 2 to 5 were the four amino acids outside the scope of the invention.

TABLE 3

| Run No. | Amino acid | 300% modulus (kg/cm$^2$) | Elongation (%) | Tensile strength (kg/cm$^2$) | Hardness |
| --- | --- | --- | --- | --- | --- |
| 1 | Proline | 68 | 450 | 103 | 50 |
| 2 | Leucine | 73 | 450 | 112 | 50 |
| 3 | Homoserine | 91 | 390 | 120 | 54 |
| 4 | Valine | 76 | 390 | 105 | 49 |
| 5 | γ-Aminobutyric acid | 74 | 400 | 103 | 49 |
| 6 | Citrulline | 72 | 380 | 94 | 48 |
| 7 | Isoleucine | 78 | 450 | 122 | 50 |

EXAMPLE 3

A three-component composition was prepared from the VSB copolymer shown in Run No. 1 of Table 4, morpholine disulfide (sulfur donor) and leucine (the amino acid specified in this invention), and heat-treated under the same conditions as in Example 2. Gas generation and deformation could be effectively inhibited, and a vulcanized VSB copolymer having a good surface condition was obtained. The properties of the vulcanized copolymer are shown in Table 4.

For comparison, a composition consisting only of the VSB copolymer and morpholine disulfide was heat-treated under the same conditions as above. Gases were generated, and heavy deformation occured in the heat-treatment product. The properties of the product could not be measured.

TABLE 4

|  | Run No. 1 | Comparative Run No. 1 |
| --- | --- | --- |
| VSB copolymer[1] | 100 | 100 |
| SRF-L carbon black[2] | 40 | 40 |
| Morpholine disulfide | 2 | 2 |
| Leucine | 2 | — |
| 300% Modulus (kg/cm$^2$) | 38 | — |
| Elongation (%) | 540 | — |
| Tensile strength (kg/cm$^2$) | 74 | — |
| Hardness | 40 | — |

Note
[1]The same as in Example 1.
[2]The same as in Example 2.

What we claim is:

1. A composition comprising a vinylpyridine-styrene-butadiene copolymer and from 0.01 to 30 parts by weight per 100 parts by weight of the copolymer, of at least one amino acid selected from the group consisting of proline, leucine, isoleucine, homoserine, valine, α-aminobutyric acid, γ-aminobutyric acid, citrulline, lysine, ornithine, arginine, glutamic acid, aspartic acid, and salts of these amino acids with alkali metals, inorganic mineral acids and lower aliphatic carboxylic acids.

2. A composition comprising a vinylpyridine-styrene-butadiene copolymer, sulfur and/or a sulfur donor, and at least one amino acid selected from the group consisting of proline, leucine, isoleucine, homoserine, valine, α-aminobutyric acid, γ-aminobutyric acid, citrulline, lysine, ornithine, arginine, glutamic acid, aspartic acid and salts of these amino acids, said sulfur and/or sulfur donor being present in amounts of from 0.01 to 30 parts by weight, and wherein the amount of the amino acid is from 0.01 to 30 parts by weight, both proportions being based on 100 parts by weight of the copolymer.

3. A composition according to claim 1 wherein the amino acid is selected from the group consisting of proline, leucine, isoleucine, homoserine, valine, α-aminobutyric acid, γ-aminobutyric acid, citrulline, lysine, ornithine, arginine, glutamic acid and aspartic acid.

4. A composition according to claim 2 wherein the amino acid is selected from the group consisting of proline, leucine, isoleucine, homoserine, valine, α-aminobutyric acid, γ-aminobutyric acid, citrulline, lysine, ornithine, arginine, glutamic acid and aspartic acid.

5. An adhesive composition containing a mixture of a resorcinol-formaldehyde resin and the composition of claim 1.

6. An adhesive composition containing a mixture of a resorcinol-formaldehyde resin and the composition of claim 2.

* * * * *